(12) United States Patent
Forsman (10) Patent No.: US 7,083,223 B2
(45) Date of Patent: Aug. 1, 2006

(54) VEHICLE CAB

(75) Inventor: Lars Forsman, Torslanda (SE)

(73) Assignee: Volvo Last Vagnar AB, Göteborg (SE)

( * ) Notice: Subject to any disclaimer, the term of this patent is extended or adjusted under 35 U.S.C. 154(b) by 0 days.

(21) Appl. No.: 11/160,196

(22) Filed: Jun. 13, 2005

(65) Prior Publication Data

US 2005/0218698 A1    Oct. 6, 2005

Related U.S. Application Data

(63) Continuation of application No. PCT/SE03/01935, filed on Dec. 10, 2003.

(30) Foreign Application Priority Data

Dec. 13, 2002  (SE)  ................................. 0203685

(51) Int. Cl.
*B60R 21/00* (2006.01)
(52) U.S. Cl. ................ 296/187.13; 296/187.09
(58) Field of Classification Search .......... 296/187.13, 296/187.03, 187.09; 293/102, 132
See application file for complete search history.

(56) References Cited

U.S. PATENT DOCUMENTS

| | | | | |
|---|---|---|---|---|
| 3,511,345 A | * | 5/1970 | Motoo et al. ............... | 188/371 |
| 3,599,757 A | | 8/1971 | Takamatsu et al. | |
| 4,133,549 A | * | 1/1979 | Reidelbach et al. ........ | 280/784 |
| 4,684,151 A | * | 8/1987 | Drewek ...................... | 280/784 |
| 4,702,515 A | * | 10/1987 | Kato et al. ............. | 296/187.01 |
| 5,280,955 A | * | 1/1994 | Nelson et al. .............. | 280/756 |
| 5,868,457 A | * | 2/1999 | Kitagawa ............... | 296/187.09 |
| 6,003,934 A | | 12/1999 | Usui | |
| 6,044,725 A | * | 4/2000 | Ganser ........................ | 74/492 |
| 6,152,521 A | * | 11/2000 | Hayashi et al. ........ | 296/187.09 |
| 6,293,587 B1 | * | 9/2001 | Lapic et al. ................. | 280/784 |
| 6,371,859 B1 | * | 4/2002 | Gibson ........................ | 464/183 |
| 6,386,347 B1 | * | 5/2002 | Reynaert .................... | 188/377 |
| 6,406,088 B1 | * | 6/2002 | Tate ....................... | 296/187.03 |
| 6,419,304 B1 | * | 7/2002 | Richardson et al. ... | 296/190.03 |
| 6,554,176 B1 | * | 4/2003 | McGill .................... | 228/112.1 |
| 6,554,333 B1 | * | 4/2003 | Shimotsu et al. ........... | 293/132 |
| 6,820,924 B1 | * | 11/2004 | Caliskan et al. ....... | 296/187.03 |
| 2003/0090127 A1 | * | 5/2003 | Saeki ......................... | 296/188 |

FOREIGN PATENT DOCUMENTS

DE          4239460          *   5/1994   .................. 293/132

* cited by examiner

*Primary Examiner*—H Gutman
(74) *Attorney, Agent, or Firm*—Novak Druce & Quigg, LLP (57) ABSTRACT

A vehicle cab having a frame construction including a pair of front supporting A-pillars, a pair of rear supporting B- or C-pillars, at least one front transverse beam, which mutually connects the front supporting A-pillars, and a rear transverse beam, which mutually connects the rear supporting B or C-pillars, and a pair of roof bars, which are supported by and connect the front supporting A-pillars to the rear supporting B or C-pillars.

14 Claims, 6 Drawing Sheets

PRIOR ART

FIG.1

PRIOR ART

VEHICLE CAB

CROSS-REFERENCE TO RELATED APPLICATIONS

The present application is a continuation patent application of International Application No. PCT/SE03/01935 filed 10 Dec. 2003 which was published in English pursuant to Article 21(2) of the Patent Cooperation Treaty, and which claims priority to Swedish Application No. 0203685-3 filed 13 Dec. 2002. Said applications are expressly incorporated herein by reference in their entireties.

TECHNICAL FIELD

The present invention relates to a vehicle cab for a vehicle. More particularly, it relates to a vehicle cab which is constructed around a frame construction comprising (including) a front A-pillar and a second substantially upright pillar located behind said A-pillar, for example a B-pillar or C-pillar, which pillars jointly support a roof bar.

BACKGROUND OF THE INVENTION

Vehicle cabs are usually built around a frame construction. The look of the frame construction is largely determined by strength requirements which ensure that the cab has good collision characteristics and provides a secure driver's compartment should the vehicle overturn. More particularly, the beams which support the roof of the cab, the roof bars, are configured to resist deformation should the upper part of the cab collide with a fixed object. In modern vehicles, moreover, high demands are placed upon visibility and space. It is therefore desirable for the frame construction to be formed from as narrow of beams as possible. Should the dimensions of the roof bar be reduced, there is a risk of the roof bar being broken off or bent in toward the interior of the cab in the event of collision with a fixed object. Should the roof bar become broken or bent, there is a risk of the upper part of the A-pillar being pressed down and into the cab so that a driver is at high risk of an injury/accident. In order to ensure that bending or breakage shall not take place, roof bars have therefore been made in thick dimensions. This results in increased weight for the cab, whereupon other included beams also have to be made in relatively thick dimensions.

SUMMARY OF THE INVENTION

An object of the invention is to provide a vehicle cab having a roof bar, in which the risk of the roof bar being broken off or bent is reduced while at the same time the roof bar is allowed to be configured in relatively slender dimensions. According to the teachings of the invention, the roof bar has a deformation zone in the front part of the roof bar directed toward the A-pillar and in which the deformation zone is divided into a set of consecutively arranged segments and is arranged with a geometry which ensures that the compressive stress at the most heavily loaded point in each segment is constant or decreasing for following segments in the rearward direction. As a result of the deformation zone, the roof bar is guaranteed to be deformed in the event of collision, with accompanying absorption of energy. The configuration of the deformation zone ensures that the segments of the deformation zone are plasticized in the direction from front to rear, with accompanying absorption of energy. The result of this is that the roof bar will not be able to be bent or broken off before the whole of the deformation zone has been deformed. The risk of the roof bar being broken or bent in an uncontrolled manner outside the deformation zone is herewith reduced, firstly by the fact that the vehicle is slowed as energy is absorbed in the deformation zone and secondly by the fact that the necessary force for achieving bending or breakage is greater for a shorter beam. By virtue of this combined effect, the risk of uncontrolled bending or breakage of the roof bar outside the deformation zone is considerably reduced if deformation zones of moderate length are used.

According to the description above, the deformation zone is divided into segments. According to one embodiment of the invention, the segments are arranged with a geometry which ensures that the compressive stress at the most heavily loaded point for each cross section within each segment is constant or decreasing in the rearward direction. This means that the compressive stress at the most heavily loaded point for each cross section within the whole of the deformation zone is constant or decreasing in the rearward direction.

According to an alternative embodiment, each segment contains a weakening of the roof bar in the form of a buckling notch or a waster. Plasticization will begin in the vicinity of the buckling notches in which the segment has the greatest compressive stress. As a result of the geometric configuration of the roof bar and the weakenings, the segments of the deformation zones are guaranteed to be plasticized in the direction from front to rear, with accompanying absorption of energy.

The segments thus constitute a virtual division of the deformation zone, in which each segment contains, should local weakenings occur, one such weakening.

BRIEF DESCRIPTION OF THE DRAWINGS

The invention will be described in greater detail below with reference to the appended drawing figures, in which.

PREFERRED EMBODIMENTS

Figure 1:
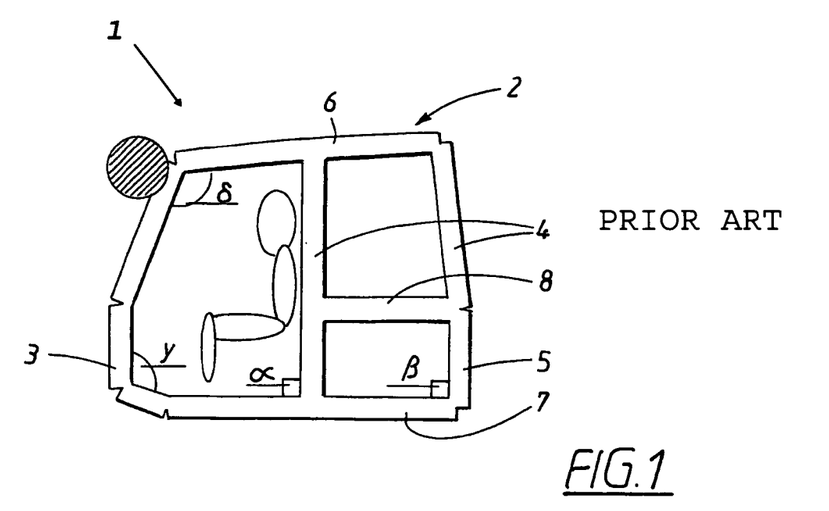
FIG. 1 is a schematic view showing a vehicle cab according to the prior art.

FIG. 1 depicts a side view of a cab 1 of known design. The cab 1 is constructed around a frame construction 2 comprising (including, but not necessarily limited to) on each side of the cab a front A-pillar 3 and, as appropriate, an intermediate B-pillar 4 and a rear C-pillar 5. These pillars 3–5 are substantially upright and are arranged to lend the cab stability and support a roof bar 6. The roof bar 6 is arranged to support the roof of the cab. In the lower part of the cab there is also a substantially horizontally arranged lower floor beam 7 supporting the A-pillar 3, the B-pillar 4 and the C-pillar 5. The opposite side of the cab (not shown) has an identical set of A, B and C-pillars. The cab further comprises a front transverse beam (not shown) which mutually connects the two front supporting A-pillars, and a rear transverse beam (not shown) which mutually connects the two rear supporting B or C-pillars. In addition to the floor beam 7, the cab can also comprise further longitudinal beams 8 which are arranged to lend further stability to the cab.

Figure 2:
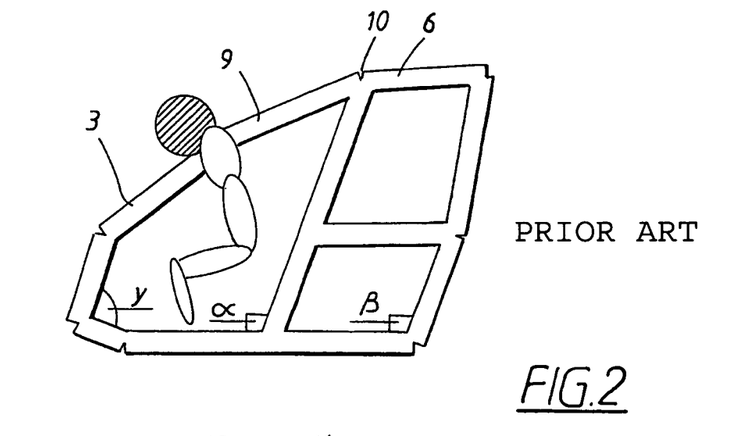
FIG. 2 is a schematic view showing a vehicle cab according to the prior art, in which the roof bar has been buckled in a collision.

FIG. 2 illustrates the cab shown in FIG. 1 after collision with a fixed object which has struck the upper part of the cab at the level of the roof bar. This type of collision can occur when a vehicle is jammed against the roof in a viaduct. In the collision, the roof bar 6, owing to its rigid structure, has been displaced rearward in the cab. The rear part of the cab has therefore been deformed as a result of the shearing forces generated. The shearing results, inter alia, in an alteration of the angle α (alpha) between B-pillar 4 and floor beam 7. The angle β (beta) between C-pillar 5 and floor beam 7, and the angle γ (gamma) between A-pillar 3 and floor beam 7, have also been altered.

Since the roof bar initially is not significantly deformed, the compressive force in the longitudinal direction of the roof bar is high. This results in the roof bar being able to be buckled. FIG. 2 illustrates how the roof bar 6 has been buckled close to the securement to the B-pillar 4. In the course of the buckling, very large deformations occur in the front part of the cab in which the front part 9 of the roof bar 6 and the A-pillar 3 are bent into the cab like a pair of pivot arms hinge-fastened at the buckling point 10 of the roof bar.

Figure 3:
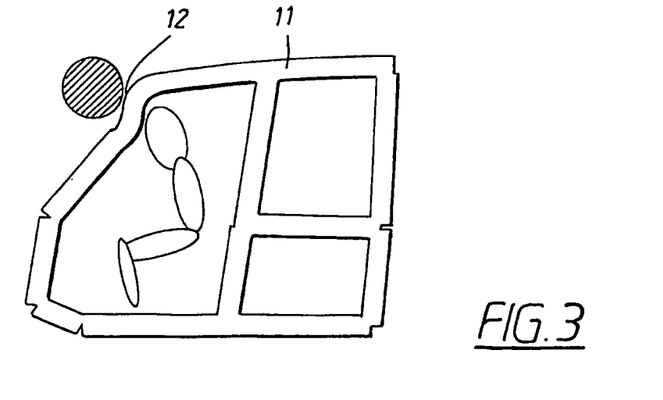
FIG. 3 is a schematic view showing the same collision process as in FIG. 2, but in which a roof bar configured according to the invention has been utilized.

FIG. 3 shows diagrammatically a cab of the same construction as in FIG. 1 and 2, but in which the roof bar 11 has been configured according to the invention. The cab has been exposed to the same collision as the cab shown in FIG. 2. The roof bar 11 has a deformation zone 12 in the front part of the roof bar directed toward the A-pillar 3. The deformation zone is divided into a set of consecutively arranged segments. The deformation zone 12 is arranged with a geometry which ensures that the compressive stress at the most heavily loaded point in each segment constant or decreasing for following segments in the rearward direction. Hence the whole of the deformation zone 12 has to be deformed, with accompanying absorption of energy, before the roof bar can be broken or bent outside the deformation zone. Further, the geometric configuration ensures that plasticization first begins in the foremost segment and then propagates in the rearward direction in consecutively following segments. Since the deformation zone is deformed with accompanying absorption of energy, the load on other parts of the cab is reduced. This has the result that the deformation in the rear part of the cab is slight.

Should the deformation zone of the roof bar be completely deformed, the force action in the longitudinal direction of the roof bar occurs on a shorter roof bar than was initially the case. A shorter roof bar can be subjected to higher load before buckling occurs for a given dimension of the roof bar. Further, a part of the energy to be absorbed by the vehicle in the collision has already been spent on deformation of the deformation zone of the roof bar. By virtue of this combined effect, the risk of buckling is considerably reduced if deformation zones of moderate length are used. Since the roof bar no longer buckles, but rather the deformation zone of the roof bar is deformed, lesser deformations of the front part of the cab also occur. The invention is especially favorable when it is utilized in cabs in which the roof bar 11 is joined to the A-pillar 3 at an intermediate angle δ (delta) less than 135°. Should buckling take place, greater penetration into the cab occurs for cabs in which the A-pillar forms a steep front against the roof bar; i.e., cabs in which the roof bar 11 is joined to the A-pillar 3 at an intermediate angle δ proximate to 90°.

Figure 4:
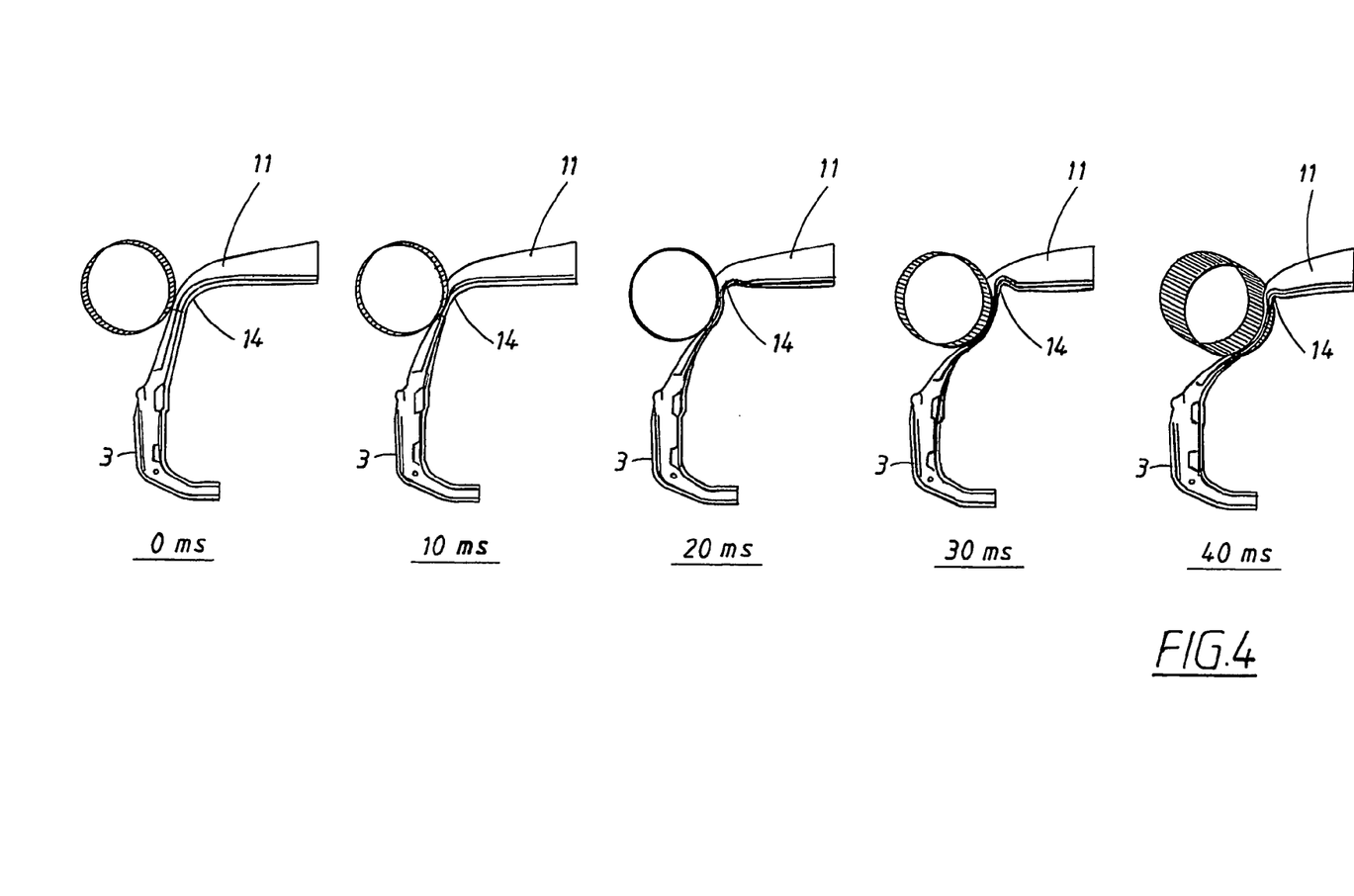
FIG. 4 is a series of schematic views simulating a collision process in which a roof bar configured according to the invention is utilized.
Figure 5:
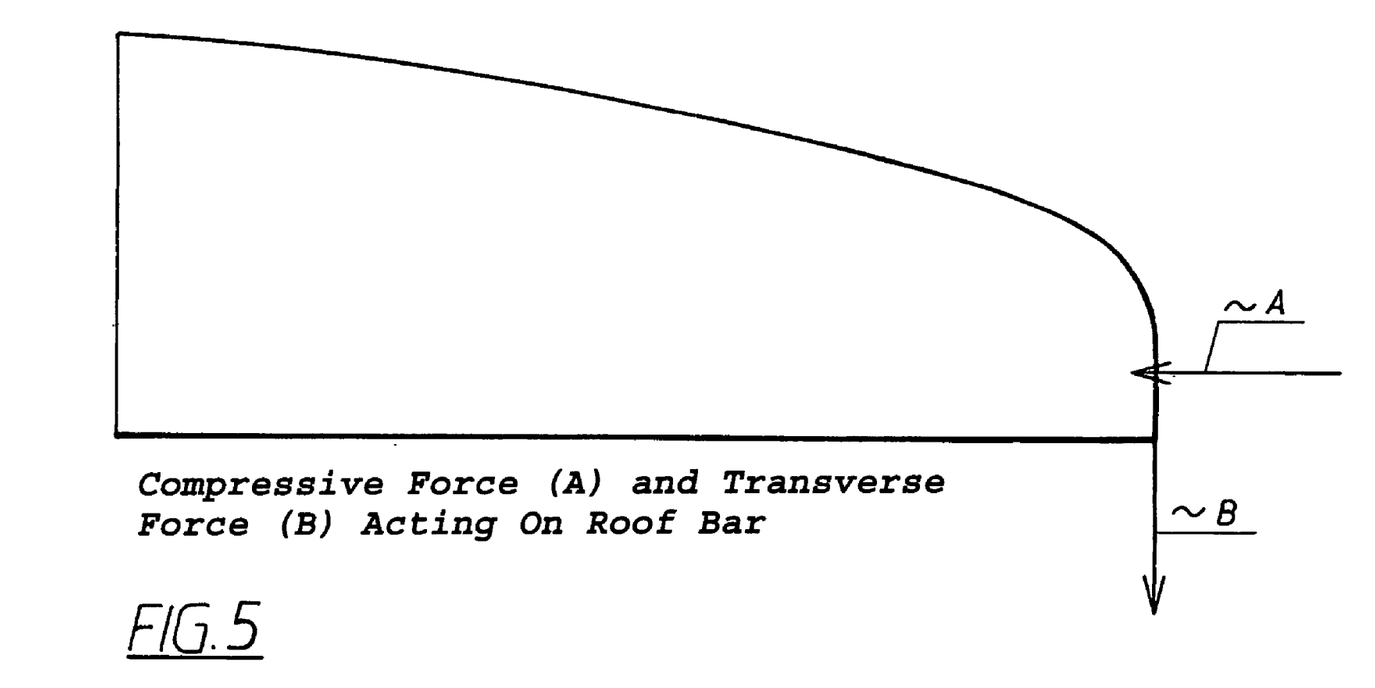
FIG. 5 shows a load case for a roof bar.

A simulation of a collision process is shown in FIG. 4 and in which a roof bar configured according to the teachings of the invention is utilized. The simulation shows that buckling does not take place. The figure illustrates that the roof bar 3 is connected to the A-pillar 3 in a connecting region 14. The simulation is conducted according to the Swedish impact test series—the front impact part. The dimensions for the deformation zone of the roof bar are given by $h=50+3*(x)^{1/2}$ mm; i.e. A=50 and B=3 in the formula for the shape. In the simulation, a compressive force acting along the roof bar is applied as is a bending force acting transversely to the roof bar as illustrated in FIG. 5. In order to obtain a compressive stress in the roof bar (the maximum value of which for each cross section is constant along the whole of the roof bar), the height (h) of the roof bar shall vary according to $h=A+B(x)^{1/2}$, in which A is proportional to the compressive force acting along the roof bar and B is proportional to the force acting transversely to the roof bar. The relationship between these two forces is given by the standardized impact test series. The size of A and B is optimized for a chosen load case and a given cab structure. Since local disturbance forces are generated on the part of the beam in which the impact occurs, plasticization will occur from the front part of the deformation zone rearward in the event of an actual collision. Plate thickness and material suitably are also chosen to achieve good results.

Figure 5A:
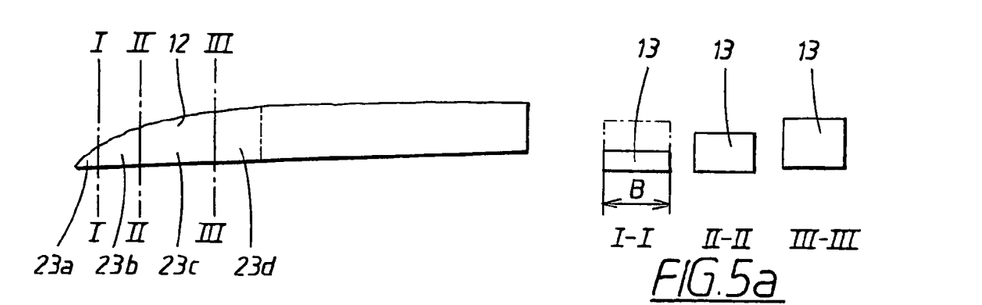
FIG. 5a–5d show different technical solutions for achieving deformation zones in the roof bar.
Figure 5B:
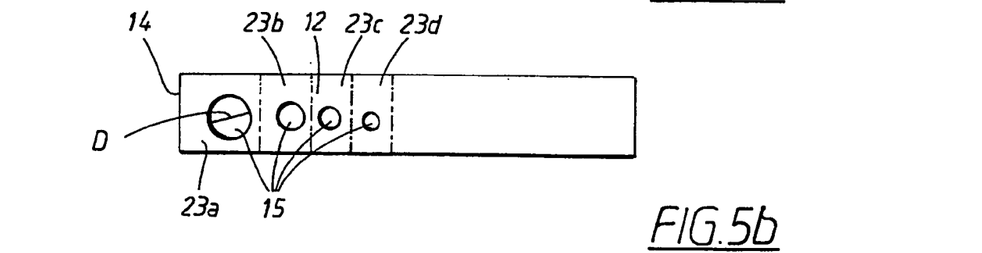
Figure 5C:
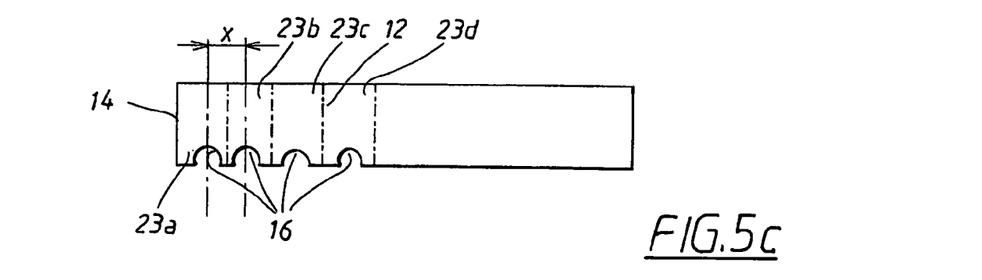
Figure 5D:
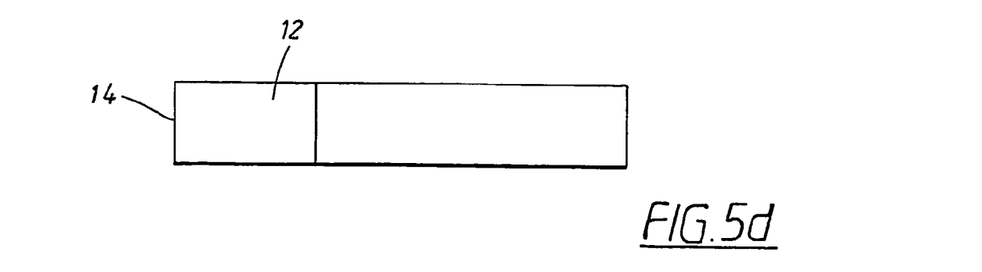

FIGS. 5a–5d depict different embodiments of the deformation zone of the roof bar. The deformation zone is preferably configured such that the necessary compressive force for plastic deformation of the roof bar increases from a connecting region, in which said roof bar and front A-pillar are connected, in the direction rearward toward said rear supporting B- or C-pillar. The deformation zone is divided into a set of consecutively arranged segments 23a–23d, in which the deformation zone is arranged with a geometry which ensures that the compressive force at the most heavily loaded point in each segment is constant or decreasing for following segments in the rearward direction. Should the deformation zone be configured such that the flexural rigidity constantly increases in the rearward direction (either as a result of increasing beam height according to the embodiment shown in FIG. 5a, or as a result of constant alteration of the material composition, as shown in FIG. 5d), the division into segments can be realized arbitrarily. Should local weakenings be arranged along the beam, as is shown in the exemplary embodiment illustrated in FIGS. 5b and 5c, each segment shall contain such a weakening.

In FIG. 5a, the roof bar, within the deformation zone 12, has a cross-sectional area 13 which increases from a connecting region 14, in which said roof bar and front A-pillar are connected, in the direction rearward toward said rear supporting B- or C-pillar. Also shown in FIG. 5a are three sections I—I, II—II and III—III through the roof bar. In the preferred example shown, the roof bar has the same width 13 in the various cross sections, but with increasing height in the rearward direction.

In FIG. 5b, the deformation zone has recesses 15 having a cross-sectional area D which decreases from a connecting region, in which said roof bar and front A-pillar are connected, in the direction rearward toward said rear supporting B- or C-pillar. The recesses result in the load-absorbing cross-sectional area of the roof bar increasing in the direction rearward along the roof bar. The deformation zone is divided into segments 23a–23d, in which each segment contains a recess.

In FIG. 5c, the deformation zone has buckling notches 16 arranged at an interval X which increases from a connecting region 14, in which the roof bar and front A-pillar are connected, in the direction rearward toward the rear supporting B- or C-pillar. It is also possible to configure the buckling notches with different depth or shape and thereby cause the necessary compressive force for plastic deformation of the roof bar to increase from a connecting region, in which the roof bar and front A-pillar are connected, in the direction rearward toward said rear supporting B- or C-pillar. The deformation zone is divided into segments 23a–23d in which each segment contains a buckling notch 16.

In FIG. 5d, the deformation zone has a material composition arranged such that the necessary compressive force for plastic deformation of the roof bar increases in the direction rearward toward said rear supporting B- or C-pillar. The material composition can be achieved by forming the roof bar in an alloy in which the composition varies along the length of the roof bar. The alloy is formed with increasing degree of hardness in the direction rearward toward said rear supporting B- or C-pillar. Alternatively, the roof bar can be achieved by lamination formed with increasing degree of hardness in the direction rearward toward said rear supporting B- or C-pillar. According to another alternative embodiment, the varying degree of hardness is achieved by local heat treatment of the roof bar, whereby the roof bar is given a locally varying degree of softness, which hardens in the direction rearward toward said rear supporting B- or C-pillar.

Figure 6:
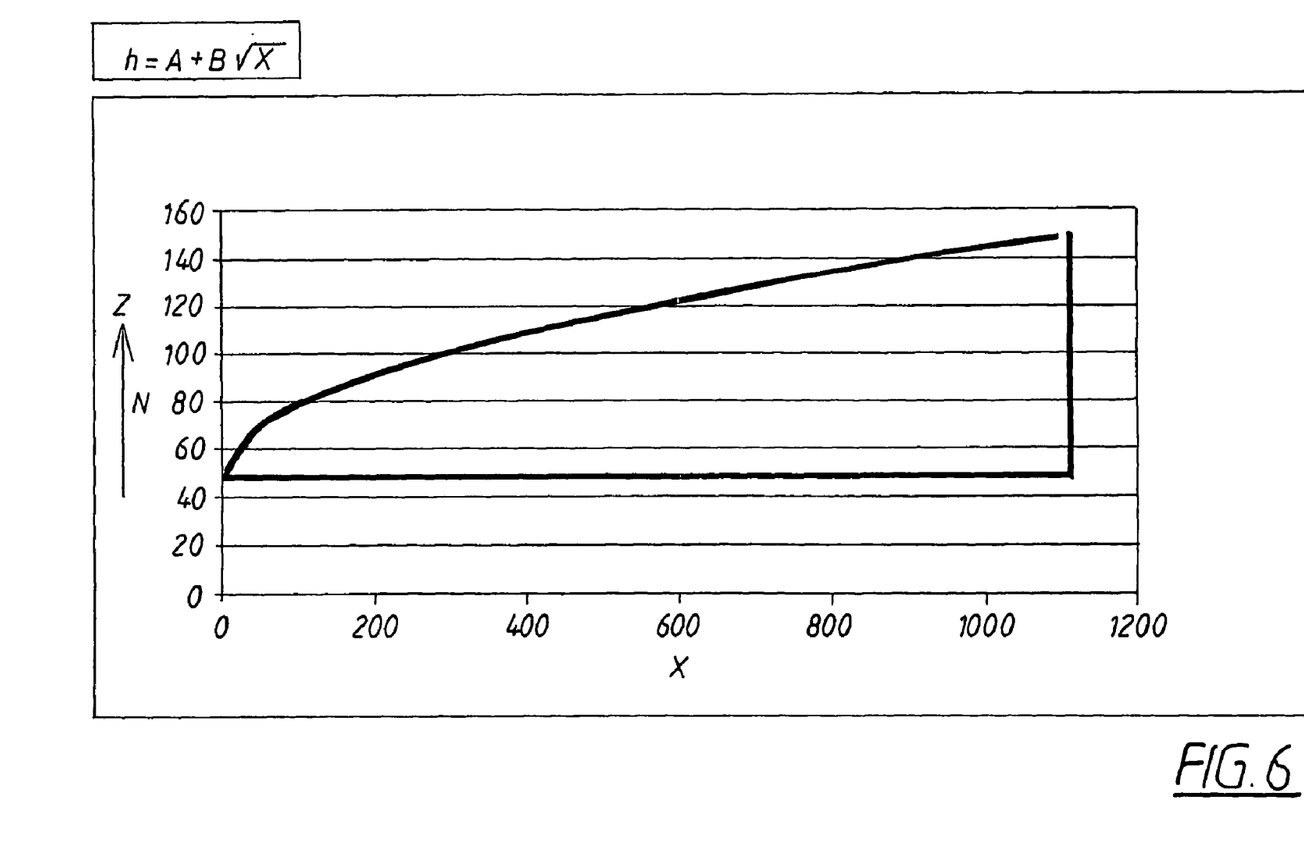
FIG. 6 is a graphic showing necessary compressive force for plastic deformation of the roof bar as a function of the position in the longitudinal direction of the roof bar for a deformation zone configuration which is optimized for a certain vehicle.

In FIG. 6, a preferred embodiment of the invention is shown and in which the roof bar within the deformation zone is configured such that the necessary compressive force for plastic deformation of the roof bar increases according to the formula $A+B*X^{1/2}$, in which X corresponds to the distance from the connecting region in which said roof bar and front A-pillar are connected. This is preferably achieved by ensuring that the height of the roof bar varies according to $h=A+B*X^{1/2}$, the maximal compressive stress being constant along the whole of the deformation zone. Since no local weakenings are present, the whole of the deformation zone can be regarded as one segment. In one embodiment of the invention, the whole of the roof bar is made with a height configured according to the above formula from the front end of the roof bar by the A-pillar to the rear end of the roof bar by the B-pillar. In another embodiment, the height outside the deformation zone exceeds the height given by the above formula.

According to preferred embodiments, the deformation zone extends along between 50 and 200 mm for a roof bar 1000 mm in length. The deformation zone therefore comprises between 5 and 20% of the length of the roof bar.

According to a further preferred embodiment, the roof bar is configured such that the necessary compressive force for buckling of the roof bar is at least 20%, preferably at least 40%, greater at that end of the deformation zone situated farthest from the connecting region than the necessary compressive force for buckling of the roof bar close to the connecting region. This is achieved by dimensioning of the length of the deformation zone. The necessary force for buckling the whole of the unaffected roof bar; i.e., the necessary compressive force for buckling of the roof bar by the connecting region, is calculated theoretically, in which the deformation zone is assumed not to be deformable. This is necessary, since the deformation zone has been configured such that buckling cannot take place before the whole of the deformation zone has been deformed.

Figure 7:
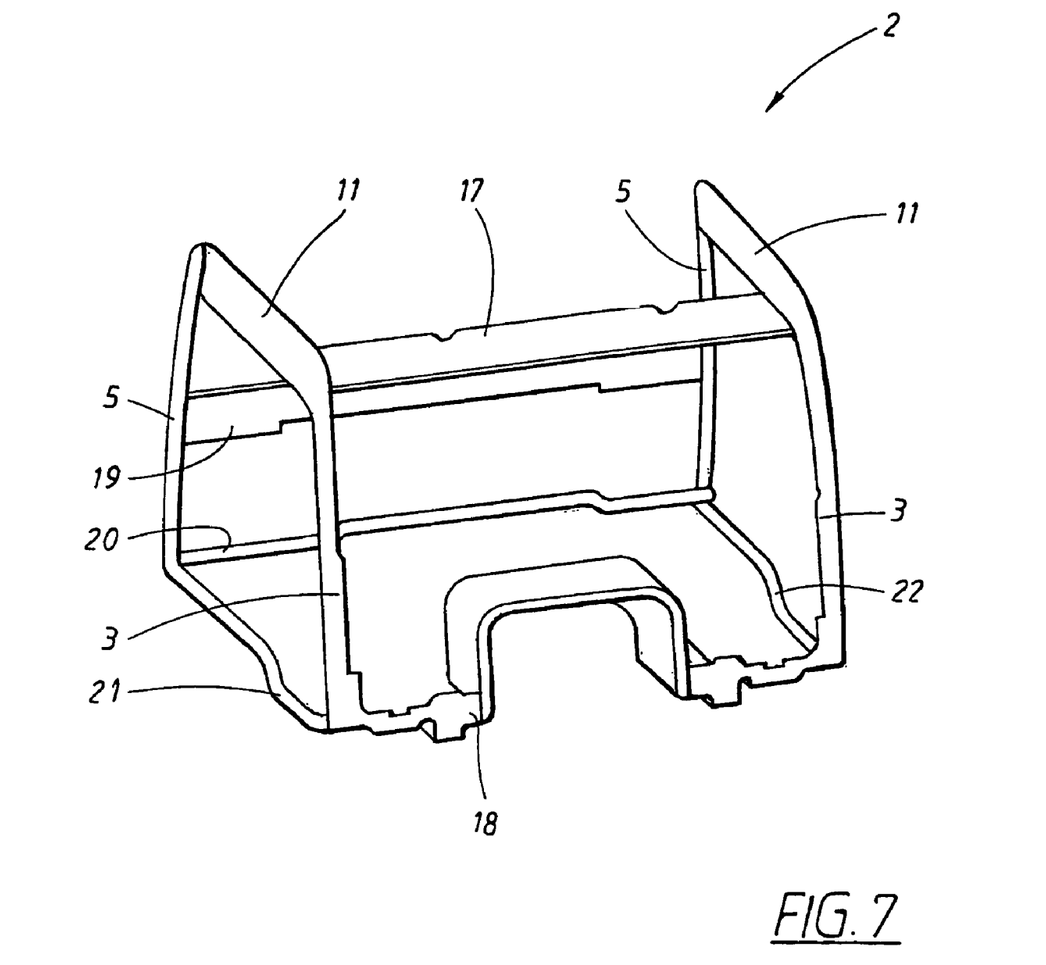
FIG. 7 is a perspective view of a cab that is configured according to the teachings of the present invention.

In FIG. 7 a frame construction 2 is shown for a vehicle cab configured according to the present invention. The frame construction 2 comprises a pair of front A-pillars 3 and a pair of rear C-pillars 5. The A-pillars 3 are connected by an upper front transverse beam 17 and a lower front transverse beam 18. The C-pillars 5 are connected by an upper rear transverse beam 19 and a lower rear transverse beam 20. The A- and C-pillars are connected by lower longitudinal beams 21, 22. The roof bars 11 connect the A-pillar to the B-pillar in the roof region.

What is claimed is:

1. A vehicle cab having a frame construction comprising:
   a pair of front supporting A-pillars, a pair of rear supporting B or C pillars and a pair of roof bars which are supported by and connect said front supporting A-pillars to said rear supporting B or C-pillars; and
   said roof bars having a deformation zone in the front part of the roof bar directed toward said A-pillar, said deformation zone being divided into a set of consecutively arranged segments in which the deformation zone is arranged with a geometry that ensures that the compressive stress at the most heavily loaded point in each segment is constant or decreasing for the following segments in the rearward direction.

2. The vehicle cab as recited in claim 1, wherein said segments are arranged with the geometry which ensures that the compressive stress at the most heavily loaded point for each cross section within each segment is constant or decreasing in the reanvard direction.

3. The vehicle cab as recited in claim 1, wherein said deformation zone is configured such that the necessary applied compressive force for plastic deformation of the roof bar increases from a connecting region, in which said roof bar and front A-pillar are connected, in the direction rearward toward said rear supporting B- or C-pillar.

4. The vehicle cab as recited in claim 1, wherein said roof bar, within said deformation zone, is configured such that the necessary compressive force for plastic deformation of the roof bar increases according to the formula $A+B*X^{1/2}$, in which X corresponds to the distance from the connecting region in which said roof bar and front A-pillar are connected.

5. The vehicle cab as recited in claim 1, wherein said roof bar, within said deformation zone, is configured with a height according to the formula $A+B*X^{1/2}$, in which X corresponds to the distance from the connecting region in which said roof bar and front A-pillar are connected.

6. The vehicle cab as recited in claim 3, wherein said roof bar, within said deformation zone, has a cross-sectional area which increases from a connecting region, in which said roof bar and front A-pillar are connected, in the direction rearward toward said rear supporting B- or C-pillar and whereby the necessary compressive force for plastic deformation of the roof bar increases in the direction rearward toward said rear supporting B- or C-pillar.

7. The vehicle cab as recited in claim 3, wherein said roof bar, within said deformation zone, has recesses having a cross-sectional area which decreases from a connecting region, in which said roof bar and front A-pillar are connected, in the direction rearward toward said rear supporting B- or C-pillar and whereby the necessary compressive force for plastic deformation of the roof bar increases in the direction rearward toward said rear supporting B- or C-pillar.

8. The vehicle cab as recited in claim 3, wherein said roof bar, within said deformation zone, has buckling notches arranged at an interval which increases from a connecting region, in which said roof bar and front A-pillar are connected, in the direction rearward toward said rear supporting B- or C-pillar and whereby the necessary compressive force for plastic deformation of the roof bar increases in the direction rearward toward said rear supporting B- or C-pillar.

9. The vehicle cab as recited in claim 3, wherein said roof bar, within said deformation zone, has a material composition arranged such that the necessary compressive force for plastic deformation of the roof bar increases in the direction rearward toward said rear supporting B- or C-pillar.

10. The vehicle cab as recited in claim 9, wherein said material composition is achieved by local heat treatment of the roof bar, whereby the roof bar is given a locally varying degree of softness, which hardens in the direction rearward toward said rear supporting B- or C-pillar.

11. The vehicle cab as recited in claim 1, wherein said deformation zone extends between 5 and 20% along the length of the roof bar.

12. The vehicle cab as recited in claim 1, wherein the necessary compressive force for buckling of the roof bar is at least 20% greater at that end of the deformation zone situated farthest from said connecting region than the necessary compressive force for buckling of the roof bar close to said connecting region.

13. The vehicle cab as recited in claim 1, wherein the necessary compressive force for buckling of the roof bar is at least 40% greater at that end of the deformation zone situated farthest from said connecting region than the necessary compressive force for buckling of the roof bar close to said connecting region.

14. A truck comprising a vehicle cab having a frame construction, said vehicle cab comprising:

a pair of front supporting A-pillars, a pair of rear supporting B or C pillars and a pair of roof bars which are supported by and connect said front supporting A-pillars to said rear supporting B or C-pillars; and said roof bars having a deformation zone in the front part of the roof bar directed toward said A-pillar, said deformation zone being divided into a set of consecutively arranged segments in which the deformation zone is arranged with a geometry that ensures that the compressive stress at the most heavily loaded point in each segment is constant or decreasing for the following segments in the rearward direction.

* * * * *